April 10, 1934.  R. K. JEFFREY ET AL  1,954,048
TOOL HOLDER
Original Filed Jan. 6, 1931
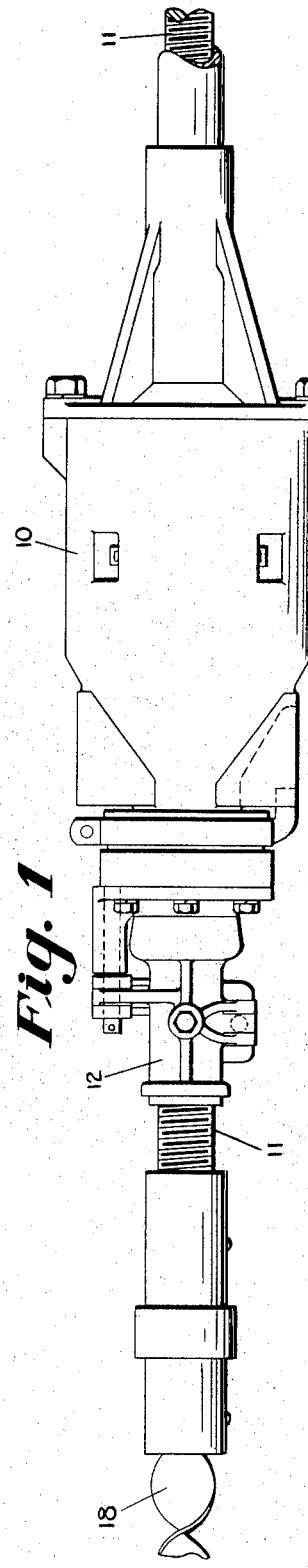
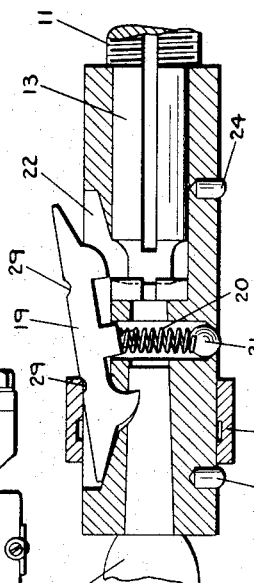
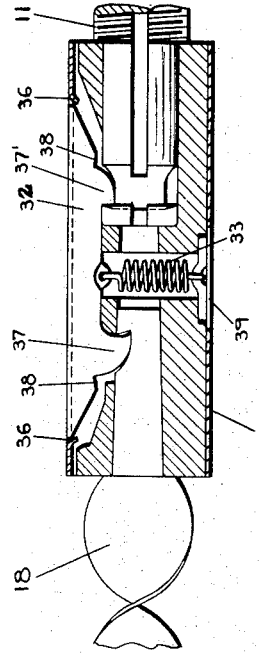
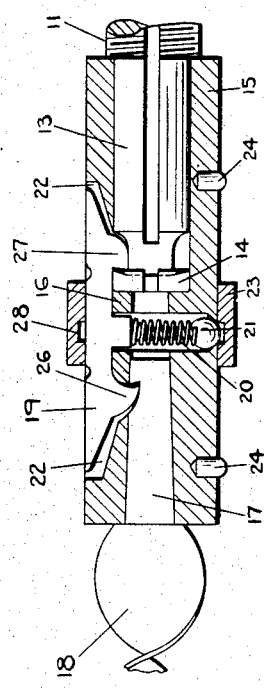
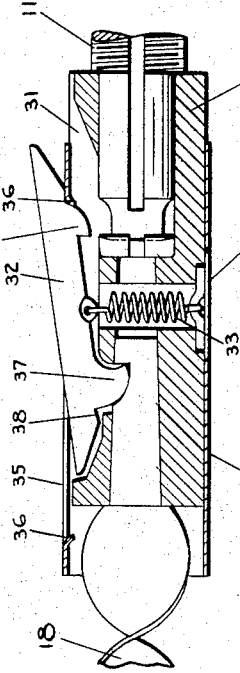
INVENTORS
Robert K. Jeffrey
and
Sterling C. Moon.

Patented Apr. 10, 1934

1,954,048

UNITED STATES PATENT OFFICE 1,954,048

TOOL HOLDER

Robert K. Jeffrey and Sterling C. Moon, Columbus, Ohio, assignors to The Jeffrey Manufacturing Company, Columbus, Ohio, a corporation of Ohio Application January 6, 1931, Serial No. 507,002
Renewed April 22, 1932

19 Claims. (Cl. 279—78)

The present invention relates to tool sockets, and is here shown in connection with the auger of a drilling machine, although it will be understood that its use is not limited to the specific machine with which it is here shown.

It has for its object to provide a socket from which the tool or auger may be readily removed and of such construction that the socket which carries the auger may be removed from the power shaft, by which the tool is carried, a single instrumentality being provided to effect locking of the parts together or the releasing of one or the other of the parts.

In the drawing herewith is illustrated one embodiment of the invention, but it will be understood that this disclosure is not restrictive, but is merely illustrative of one embodiment.

In the drawing:—

Figure 1 is a view in plan of a mechanism to which the invention may be applied, this mechanism being a drill such as is commonly used in driving shot holes in coal faces.

Figure 2 is a view in longitudinal section of the socket, showing the locking device in one of its three positions.

Figure 3 is a view similar to Figure 2, showing the locking device in another of its three positions.

Figure 4 is a longitudinal section showing a slightly modified form of the device with the locking element in one of its three positions.

Figure 5 is a longitudinal section of the modified form shown in Figure 4, showing the locking element in another of its three positions.

Referring to the drawing by numerals, like numbers indicating like parts in the several views, 10 indicates a motor casing for the drill driving motor. 11 indicates a feed screw, which, through mechanism connected with the motor, is rotated, and 12 indicates a fixed nut member through which the feed screw 11 passes, and by which it is advanced when the feed screw is rotated by the motor. As the particular drill drive is not a part of the present invention, detailed illustration and description is unnecessary.

The feed screw 11 is provided at its forward end with a socket engaging portion 13, having a reduced and flanged tip 14 to be engaged by the locking element of the socket. The forward end 13 of the feed screw engages a suitable opening in the socket member 15, with the flanged tip of the end 13 taking a firm bearing against a cross abutment 16 in the socket 15, the socket 15 and the reduced end 13 of the feed screw 11 being so connected, as, for example, by a key connection, to form a rotating driving connection between the feed screw 11 and the socket.

The opposite end of the socket member 15 is provided with a recess to receive the tail 17 of the auger 18 so as to impart rotation thereto.

In order that the auger 18 may be firmly held against longitudinal displacement relative to the socket 15, and that the socket 15, with its auger, may be held against longitudinal displacement relative to the reduced end 13 of the feed screw 11, there is provided the locking dog 19, which is loosely mounted and supported by the spring 20 resting upon the bearing ball 21 with a portion of the ball projecting through an opening in the side wall of the socket 15, as shown in Figures 2 and 3. The tendency of the spring 20 is, of course, to eject the locking dog 19 from the recess 22 in the side of the socket in which the dog is mounted, and in normal position this tendency of the spring to eject the locking dog will be resisted by a slide ring 23, which is freely movable on the socket member 15 between the stops 24 projecting from the wall of the socket member. In Figure 2 the parts are shown in normal working condition, the socket mounted in proper position on the reduced end 13 of the screw, and the auger mounted in the forward end of the socket member. With the ring in the position shown in Figure 2, the dog will be held in place against the stress of the spring 20, with its teeth 26 and 27 in engagement with the recess in the tail 17 of the auger and with the flanged end of the feed screw. Under these conditions, the parts will be firmly locked together for the operation of boring. Preferably, the slide ring 23 will be provided with an internal groove 28, which, as shown, will be engaged by the spring supported ball 21 to prevent its accidental displacement, although the ring 23 may be readily moved past the ball into its other positions of adjustment.

If it is desired to move the socket and the auger from the feed screw, the ring 23 will be moved to the off-center position shown in Figure 3, whereupon the spring 20 will immediately eject the opposite end of the dog from its recess, as shown in Figure 3, and the socket may be removed from the feed shaft. Locking dog 19 will preferably have the grooves 29, which, when the ring 23 is moved to one or the other of its off-center positions, will be engaged by the edge of the ring to hold the parts temporarily in their adjusted position.

When the ring 23 is moved to the position opposite that shown in Figure 3, the movement of the locking dog will be reversed, the auger holding tool 26 will be ejected by the spring, and the auger 18 may then be moved from its socket.

It will be seen that the recess 22, which receives the locking dog, is of sufficient depth at its ends so that when the dog is raised by the spring to release one or the other of the socket engaging members, there will be clearance enough for the end of the dog to rock slightly as the spring ejects the other end to the inclined position, so that no jamming of the parts can occur, and the spring will surely lift and rock the dog.

Referring now to Figures 4 and 5, it will be seen that the same general arrangement of feed screw, auger, and socket, is provided as that just described. The socket 30 is provided with the dog seat 21, and a generally similar dog 32 is provided. The dog is of the floating type, and is held by a pulling spring 33, instead of an ejecting spring, which spring is anchored at the bottom of the socket as shown. In order to lift and rock the dog 32 in this construction, there is provided a dog actuating ring, which takes the form of a sleeve 34 of sufficient length, and provided with a slot 35 in its top, which registers with the dog 32. The slot 35 is provided at each end with a dog actuating projection 36, which, when the parts are in the working position shown in Figure 5, will lie just beneath the ends of the dog. With this construction, movement of the sleeve in one direction, as shown in Figure 4, will cause the projection 36 to ride under the sloping end of the locking dog 32 and lift the tool engaging tooth 37 or 37', dependent on the direction of movement of the sleeve, from engagement, the other end of the dog 32 rocking in the recess 31, which, as stated, is so shaped as to permit tilting of the dog. Preferably, the dog 32 will be provided with notches 38, in which the projections 36 will engage to temporarily hold the parts in adjusted position. Preferably, the sleeve 34 will be provided opposite the spring 33 with an opening 39 to give easy access to the spring and its holding anchor.

Obviously, mechanical variations of the particular structure here disclosed may be made and still be within the range of the invention.

We claim:—

1. In a tool holder of the class described, the combination of a socket member having recessed ends to receive tool parts, a locking dog movably mounted on said holder and provided with teeth to project into the recessed ends and engage tool parts inserted therein, and means movable relative to said dog to effect shifting of said dog to a plurality of tool locking and releasing positions.

2. In a tool holder of the class described, the combination of a socket member having recessed ends to receive tool parts, a bodily movable locking dog mounted on said holder and provided with teeth to project into the recessed ends and engage tool parts inserted therein, and means movable relative to said dog to effect shifting of said dog to a plurality of tool locking and releasing positions.

3. In a tool holder of the class described, the combination of a socket member having recessed ends to receive tool parts, a locking dog resiliently mounted on said holder and provided with teeth to project into the recessed ends and engage tool parts inserted therein, and means movable relative to said dog to effect shifting of said dog to a plurality of tool locking and releasing positions.

4. In a tool holder of the class described, the combination of a socket member having recessed ends to receive tool parts, a bodily movable locking dog resiliently mounted on said holder and provided with teeth to project into the recessed ends and engage tool parts inserted therein, and means movable relative to said dog to effect shifting of said dog to a plurality of tool locking and releasing positions.

5. In a tool holder of the class described, the combination of a socket member having recessed ends to receive tool parts, a spring-held locking dog mounted on said holder and provided with teeth to project into the recessed ends and engage tool parts inserted therein, and means movable relative to said dog to manipulate and shift said spring-held dog to a plurality of tool locking and releasing positions.

6. In a tool holder of the class described, the combination of a socket member having recessed ends to receive tool parts, a spring projected locking dog mounted on said holder and provided with teeth to project into the recessed ends and engage tool parts inserted therein, and means movable relative to said dog to project and shift said dog to a plurality of locking and releasing positions.

7. In a tool holder of the class described, the combination of a socket member having recessed ends to receive tool parts, a tilting locking dog mounted on said holder and provided with teeth to project into the recessed ends and engage tool parts inserted therein, and means movable relative to said dog to effect tilting of and shift said dog to a plurality of tool locking and releasing positions.

8. In a tool holder of the class described, the combination of a socket member having recessed ends to receive tool parts, a loosely mounted tilting locking dog mounted on said holder and provided with teeth to project into the recessed ends and engage tool parts inserted therein, and means movable relative to said dog to effect tilting of and shift said dog to a plurality of tool locking and releasing positions.

9. In a tool holder of the class described, the combination of a socket member having recessed ends to receive tool parts, a loosely mounted spring-held tilting locking dog mounted on said holder and provided with teeth to project into the recessed ends and engage tool parts inserted therein, and means movable relative to said dog to effect tilting of and shift said dog to a plurality of tool locking and releasing positions.

10. In a tool holder of the class described, the combination of a socket member having recessed ends to receive tool parts, a tilting locking dog mounted on said holder and provided with teeth to project into the recessed ends and engage tool parts inserted therein, and a sleeve member on said holder in operative relation to said dog to effect shifting of said dog to a plurality of tool locking and releasing positions.

11. In a tool holder of the class described, the combination of a socket member having recessed ends to receive tool parts, a tilting locking dog mounted on said holder and provided with teeth to project into the recessed ends and engage tool parts inserted therein, and a sliding sleeve on said socket member to engage said dog and effect shifting of said dog to a plurality of tool locking and releasing positions.

12. In a tool holder of the class described, the combination of a socket member having recessed ends to receive tool parts, a spring-held tilting locking dog mounted on said holder and provided with teeth to project into the recessed ends and engage tool parts inserted therein, and a sliding sleeve on said socket member to manipulate and shift said spring-held dog to a plurality of tool locking and releasing positions.

13. In a tool holder of the class described, the combination of a socket member having recessed ends to receive tool parts, a spring projected tilting locking dog mounted on said holder and provided with teeth to project into the recessed ends and engage tool parts inserted therein, and a sliding sleeve on said socket member to control the movements of said spring projected dog and shift it to a plurality of tool locking and releasing positions.

14. In a tool holder of the class described, the combination with a socket member adapted to receive a tool part, of a locking dog, a sleeve movable along said socket member to hold said dog in locked position, a detent coacting with an inner annular recess in said sleeve to hold the latter in its locking position, and a compression spring acting simultaneously on said detent and on said dog.

15. In a tool holder of the class described, the combination with a tool socket member, of a dog having a tooth to engage a recess in the tool, a sleeve slidable on said socket member to effect the operation of said dog to its locking and releasing positions, a ball detent for holding said sleeve in its locking position, and a spring between said ball and said dog to act on both, said spring serving to release said dog when said sleeve is moved to releasing position.

16. In a tool holder of the class described, the combination of a socket member having recessed ends to receive tool parts, a locking dog mounted on said holder and provided with teeth spaced to project respectively into said recessed ends to engage tool parts inserted therein, said dog being longitudinally tiltable to release one or the other of said teeth from an engaged tool part, and means for holding said dog in the position wherein both of said teeth project into said recessed ends.

17. In a tool holder of the class described, the combination of a socket member having recessed ends to receive tool parts, a locking dog mounted on said holder and provided with teeth spaced to project respectively into said recessed ends to engage tool parts inserted therein, said dog being longitudinally tiltable on a plurality of longitudinally spaced axes to release one or the other of said teeth from an engaged tool part, and means for holding said dog in the position wherein both of said teeth project into said recessed ends.

18. In a tool holder of the class described, the combination of a socket member having recessed ends to receive tool parts, a locking dog mounted on said holder and provided with teeth spaced to project respectively into said recessed ends to engage tool parts inserted therein, said dog being longitudinally tiltable to release one or the other of said teeth from an engaged tool part, spring means acting on said dog in a direction to withdraw said teeth from said recessed ends, and means movable over said dog and positionable to hold it in the position wherein both of said teeth project into said recessed ends or to release either end of the dog to permit the latter to be swung about one of said axes under the action of said spring means.

19. In a tool holder of the class described, the combination of a socket member having recessed ends to receive tool parts, a locking dog mounted on said holder and provided with teeth spaced to project respectively into said recessed ends to engage tool parts inserted therein, said dog being longitudinally tiltable to release one or the other of said teeth from an engaged tool part, spring means acting on said dog to hold the same in a position wherein both of said teeth project into said recessed ends, said dog having cam surfaces at its ends, and means movable relative to said dog to engage one or the other of said cam surfaces whereby the dog may be tilted in either direction.

ROBERT K. JEFFREY.
STERLING C. MOON.